United States Patent
Van De Sluis et al.

(10) Patent No.: US 8,068,225 B2
(45) Date of Patent: Nov. 29, 2011

(54) COLOR MATCHING FOR DISPLAY SYSTEM FOR SHOPS

(75) Inventors: Bartel Marinus Van De Sluis, Eindhoven (NL); Hubertus Maria Rene Cortenraad, Maastricht (NL); Elmo Marcus Attila Diederiks, Eindhoven (NL); Henriette Christine Marie Hoonhout, Eindhoven (NL); Mehmet Alper Yalvac, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 529 days.

(21) Appl. No.: 12/097,929

(22) PCT Filed: Dec. 15, 2006

(86) PCT No.: PCT/IB2006/054886
§ 371 (c)(1),
(2), (4) Date: Jun. 18, 2008

(87) PCT Pub. No.: WO2007/072376
PCT Pub. Date: Jun. 28, 2007

(65) Prior Publication Data
US 2008/0258590 A1    Oct. 23, 2008

(30) Foreign Application Priority Data
Dec. 23, 2005   (EP) .................................... 05112861

(51) Int. Cl.
*G01J 3/46* (2006.01)
(52) U.S. Cl. ...................................................... 356/402
(58) Field of Classification Search ........... 356/402–425
See application file for complete search history.

(56) References Cited

U.S. PATENT DOCUMENTS

| | | |
|---|---|---|
| 2005/0040774 A1 | 2/2005 | Mueller et al. |
| 2005/0047134 A1 | 3/2005 | Mueller et al. |
| 2006/0152172 A9 * | 7/2006 | Mueller et al. ................. 315/291 |

FOREIGN PATENT DOCUMENTS

| | | |
|---|---|---|
| DE | 202004000004 U1 | 7/2004 |
| EP | 1462711 A1 | 9/2004 |
| JP | 02253503 A | 10/1990 |

* cited by examiner

*Primary Examiner* — Tarifur Chowdhury
*Assistant Examiner* — Abdullahi Nur
(74) *Attorney, Agent, or Firm* — John F. Salazar; Mark L. Beloborodov (57) ABSTRACT

A color identifying display system having a lighting surface having an alterable apparent surface color, a color capture device to capture a color of an object placed within a detection area, and a processor. The lighting surface and the color capture device are coupled to the processor. The processor analyzes the captured color to determine a prominent color of the object and to control a color of the lighting surface based on the determined prominent color. The color of the lighting surface may be adjusted to match the prominent color, complement the prominent color, or be analogous to the prominent color.

9 Claims, 6 Drawing Sheets

COLOR MATCHING FOR DISPLAY SYSTEM FOR SHOPS

Display systems within shops are under constant modification as new objects are inserted therein. Modification often consists of changing the color within the display system. For example, display cubes are often used to display many different types of objects. As objects are moved in and out of the cube, or as a particular season or trend demands a new color, the cubes have to be painted to match the demand. Painting requires significant labor on the part of the shop owner. Further, it may be difficult to paint over certain colors, such as a dark color being painted over by a light color. It is known that some fashion shops change their collection more than 10 times a year, requiring constant modification of the display cubes.

It is an object of the present system to overcome these and other disadvantages in the prior art.

The present system proposes a display system that allows color of a structure of a display area to be easily changed and does not require painting.

The present system provides a display system that allows the color exhibited by the display system to be changed quickly and easily. A display system provides a means for image capturing, and image analysis for determination of a most prominent color. The present system allows modification of its color to be automatic based upon the characteristics of the object contained therein. An object may be illuminated in white light while allowing the environment of the display system to exhibit a matching or corresponding color. The display system allows the user to select from various colors that would be complementary to a particular object. A smart camera may be utilized for color analysis and determining the object size and position of an object present in the display system. The present system may also provide a display system with the capability of color sensing.

The following are descriptions of illustrative embodiments that when taken in conjunction with the following drawings will demonstrate the above noted features and advantages, as well as further ones. In the following description, for purposes of explanation rather than limitation, specific details are set forth such as the particular architecture, interfaces, techniques, etc., for illustration. However, it will be apparent to those of ordinary skill in the art that other embodiments that depart from these specific details would still be understood to be within the scope of the appended claims. Moreover, for the purpose of clarity, detailed descriptions of well-known devices, circuits, and methods are omitted so as not to obscure the description of the present invention.

It should be expressly understood that the drawings are included for illustrative purposes and do not represent the scope of the present system.

FIGS. 7, 8, 9, and 10 illustrate how alternate colors are offered by the color selecting means of the present system As utilized herein, a "lighting system" refers to a collection of lighting elements, such lighting elements may include light emitting diodes LEDs, halogen lights, fluorescent lights, and high intensity discharge lamps HID, and other tools, such as diffusers, combined to produce different color or colors of an environment. The lighting elements that may be useful in the present system are discussed in U.S. Patent Publication No. 2005/0040774 ("the '744 Publication), incorporated herein by reference in its entirety. The '744 Publication describes systems for illuminating objects in adjustable colors. European Patent No. EP1462711 A1, incorporated herein by reference in its entirety, describes systems for creating a variable color temperature of LED lighting.

As used herein, the term "prominent color" may refer to a color of an object that occurs over a largest viewable portion of the object with respect to any other colors of the object. The prominent color may also be the brightest color of any colors discernable from the object. The prominent color may also consist of a most prevalent color pattern or color texture of the object. Further, the prominent color may be a most saturated color of any colors discernable from the object. The prominent color may also be determined by a combination of any of the above-mentioned ways. For instance, finding the color that both occurs over a large viewable portion of the object and which has a high saturation level relative to other colors present.

The term "smart camera" refers to devices consisting of a camera and an image processor. The smart camera captures an image of objects placed within a display area and analyzes colors and textures of the objects to determine a prominent color of the objects. The prominent color determined from the objects may then be utilized by the system.

"Processor" may be used interchangeably with the terms microprocessor and CPU. In the present system, the processor contains a color setting means for passing on appropriate RGB values to the LED-array contained within the system. In use, following the input of the product's prominent color or colors from the smart camera, the processor containing the color setting means determines the corresponding color or colors to the prominent color or colors. The RGB values for the corresponding color or colors are then passed to the LED-array for visualization in the system.

It is to be noted that no detailed description will be given regarding the detailed operation of each specific lighting element. It is to be understood that the lighting elements that form part of the described systems are capable of reproducing visible light having essentially any desired color and intensity. The lighting elements may be realized, for example, in the form of multi-color light emitting diode LED devices that conform to the RGB system of colors, although other color systems may also be suitably utilized. Nevertheless, any other suitable controllable multi-color light emitting elements may be used without departing from the scope of the present system.

The term "display system" as used herein throughout may refer to any device for displaying an object within a shop environment, including but not limited to, display cubes, shelf space, a particular area within a store, a surface, such as a wall surface or counter surface, and counter space. The display system as such is the environment for displaying the object.

The term "corresponding color" refers to a color or colors that relate to the product's prominent color or colors. A corresponding color or colors, for example may be determined based on its color wheel position relative to the prominent color or colors. A corresponding color or colors may include analogous colors, which are colors that may be on either side of the prominent color, complementing colors, which are colors that are directly opposite from the prominent color, split complementary colors, which are indirect complementary colors, usually one step removed from the complementary color, and triad colors, which are three colors that are spaced equally in distance from each other on the color wheel, with the prominent color being considered the center.

Figure 1:
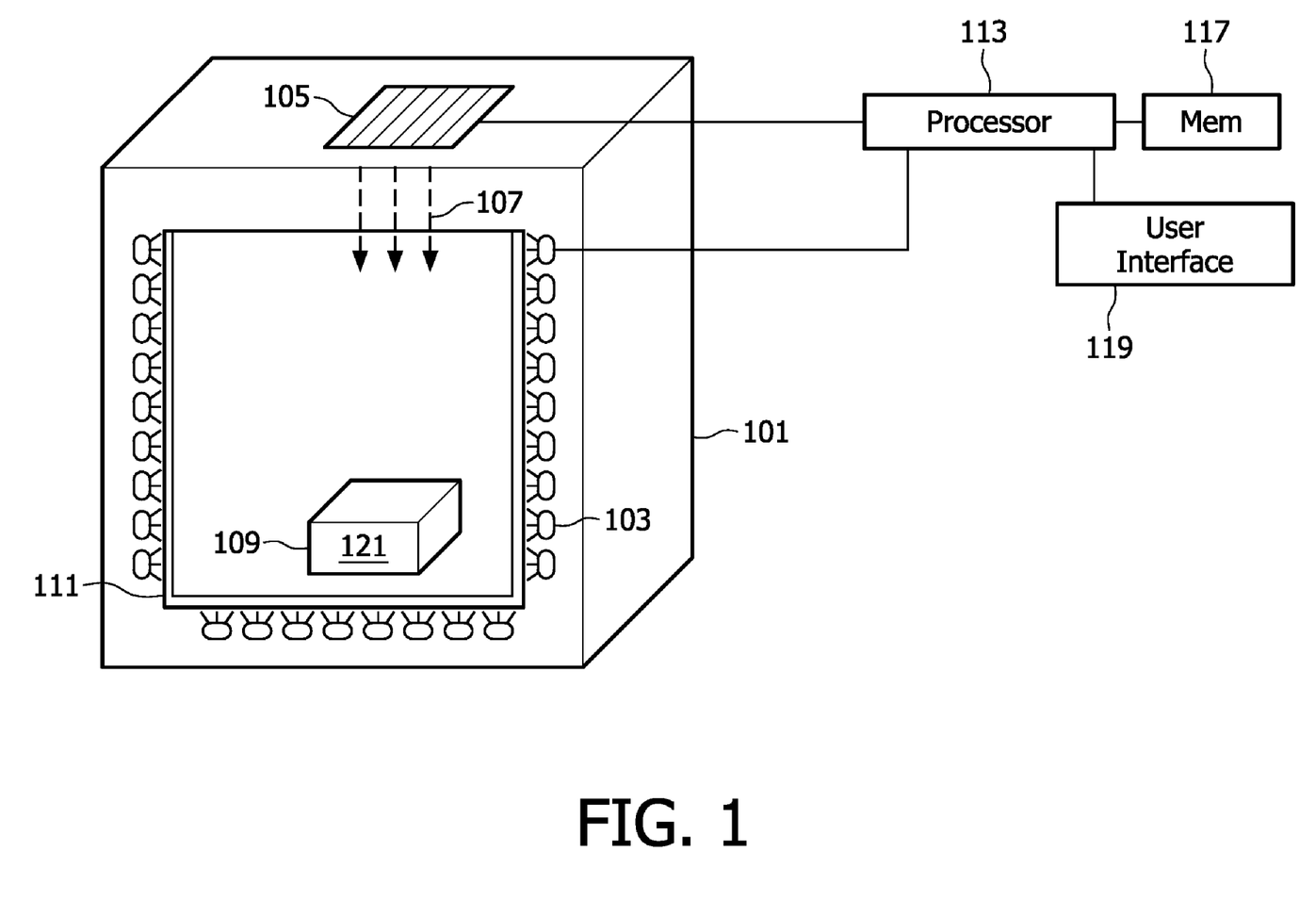
FIG. 1 is an embodiment in accordance with the present system comprising a display system, lighting elements, and a smart camera.

FIG. 1 shows a display system consisting of a display cube 101 for displaying an object 109 containing lighting elements 103 and a diffuser 111. The diffuser 111 is operable to diffuse light from the lighting elements 103 to produce a diffused light over a surface of the diffuser 111. In this way, a lighting effect is produced giving a surface of the diffuser 111 the appearance of being a color or shade that is emanating from one or more of the lighting elements 103. The diffuser 111 may also be operable to mix a plurality of colors coming from a plurality lighting elements 103 so as to produce a color that is a combination of the plurality of colors emanating from the plurality of lighting elements 103 without allowing a perception of an individual one of the plurality of colors. The diffuser may, for example, be comprised of sheets of acryl satine although clearly any other diffusing material may be suitably utilized. The lighting elements 103 and a smart camera 105 are connected to a processor 113. The processor 113 receives image data from the smart camera 105 and controls the lighting elements 103 for operation as further described herein. The processor has a memory 117 that may store color matching and color complementing information as well as program instructions for operating the processor 113, camera 105, lighting elements 103, and a user interface 119. The user interface is operable for providing information to a user and for receiving color selections from a user. The display cube 101 includes lighting elements 107 that may deliver object illumination, such as white light illumination, that illustratively may be delivered from a top portion of the cube 101. In one embodiment, the user interface 119 is provided by way of a wireless remote control device that is operably coupled to the processor 113 as shown. The remote control device using the user interface is operable to provide input to the system for user selection.

In use, the system may have an automatic mode in which the system automatically adjusts the color of an environment of the cube 101 to match the color of the object 109 on display in the cube 101. In the embodiment shown, the color of the environment is a perceived color of the diffuser 111. In one embodiment, different portions of the diffuser 111 may be colored differently such as when one portion of the object 109 is one color and another portion of the object 109 is another color and/or when there are a plurality of objects 109, positioned in the cube 101, having different colors.

Matching the color of the object 109 includes identifying a prominent color in the object 109, and coloring the lighting elements 103 to produce a perceived color of the diffuser 111 that matches or complements the objects' prominent color or colors. In one embodiment, the system may automatically switch between various colors that are suitable for matching the object 109. In this way, the object 109 may be perceived in a plurality of environments (e.g., the perceived colors of the diffuser 111) at different times, which each complement or match a color or colors of the object 109. Automatic switching may occur based on particular time intervals, which for example may vary from seconds to days. Automatic switching may also occur based on times of the day, so that particular colors are provided that correlate to the object 109 and to natural lighting provided by daylight that may be available outside the cube 101. Color switching may be a smooth transition or a more abrupt change as the system goes from one color to a next color.

The adjustment or switching of the color of the environment of the cube 101 may be initiated by the smart camera 105 illustratively positioned at the top of the cube 101. The smart camera performs this function by capturing an image of the object 109 in the cube 101, and analyzing the image to determine the prominent colors of the object 109. Based on this analysis, the lighting elements 103 via the diffuser 111 provide a visual perception that inner surfaces of the cube 101 (e.g., the perceived inner walls of the cube 101) are colored the prominent or a complementary color of the object 109. As the lighting elements 103 are used to merely provide a perceived color of the diffuser 111 as opposed to highlighting or lighting of the object 109, the lighting elements preferably have a light intensity that is sufficient to provide the perceived color, yet does not directly highlight or light the object 109.

In one embodiment, lighting elements 107, separate from the lighting elements 103, such as white or colored lighting elements, provide illumination that is utilized to highlight or spotlight the object 109 with a white or colored light. The lighting elements 107 may be lighting elements that are similar or different than the lighting elements 103. However, the lighting elements 107 are provided at an intensity (e.g., brightness) that is sufficient to highlight or spotlight the object 109. In one embodiment, the lighting from lighting elements 107 is adjusted to a size and position of the object 109. The adjustment of the light from illumination 107 may be the result of another function of the smart camera 105, that of measuring the size and position of the object.

Figure 2:
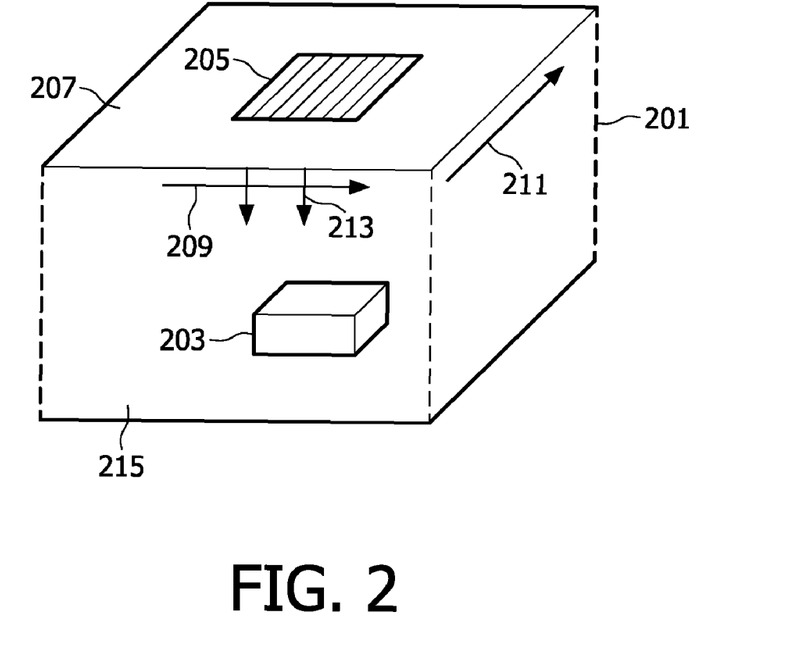
FIG. 2 is an embodiment in accordance with the present system wherein the display system contains a matrix of LEDs.

FIG. 2 shows illumination of an object 203 with illumination 213, such as white illumination, provided via a matrix of LEDs 209 and 211 integrated into a top 207 of a display cube 201. In use, a smart camera 205 captures an image of the object 203 that is utilized to determine a shape and size of the object 203 to facilitate a proper adjustment of the illumination 213. Within the smart camera 205, computer vision technology may be used to identify where the object 203 is located compared to a background 215.

Figure 3:
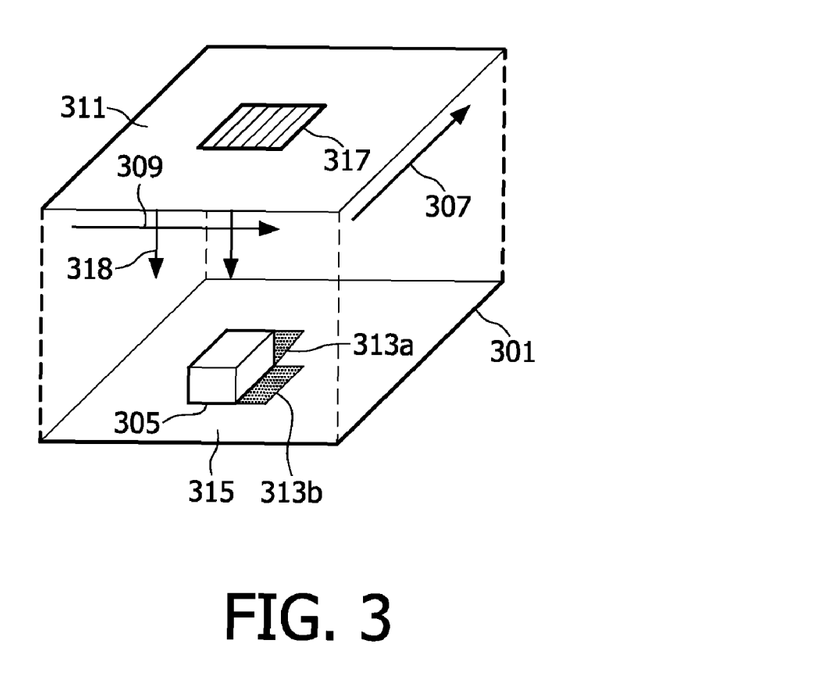
FIG. 3 is an embodiment in accordance with the present system wherein the outline of the object is determined from its shadows.

FIG. 3 is another embodiment of a system 301, to facilitate identifying a position and/or shape of an object 305 in a case wherein a color of the object 305 is similar to a color of a background 315. For example, in a case wherein the object 305 is white and the background 315 is also white. In this case, it may be difficult for a smart camera 317 to adjust an illumination 318. In this case, a row of LEDs 309 and/or a column of LEDs 307, may be housed in a matrix lamp 311. In operation, the LEDs 309 and/or the LEDs 307 are switched on and off in sequence with the smart camera 317 capturing images. As rows or columns of LEDs 309, 307 are switched on in sequence, the object 305 will cast shadows 313a, 313b that are analyzed by the smart camera 317. Information obtained from the shadows 313a, 313b may be used to determine an outline of the object 305. U.S. patent application Ser. No. 11/908,032, entitled "Multiple Point And Shape Detection With A Touch Screen", discloses a method of detecting a shape of an object using shadows and is incorporated herein in entirety. After determining the outline of the object 305, select LEDs, of the LEDs 309, 307 are then switched on that are positioned to illuminate the object 305 without illuminating the background 315.

In this and/or another embodiment, the system may be operable in a manual mode. In the manual mode, the color to be exhibited by the system will be chosen by the user via a user-interface 119 that includes input selection as illustratively shown in FIG. 1. The color selection offered to the user will be among various color alternatives that are dependent on the color analysis of the smart camera 105. Further information on the determination of color alternatives is shown and described with reference to FIGS. 7-10. The user interface 119 may consist of a button which enables the user to toggle through the various color alternatives. The button may be a press button or a touch sensitive area of the user interface 119. The button may be located inside or outside of the display cube 101.

In a further embodiment of the manual mode, upon the placement of a new object within the display cube 101, the smart camera 105 may detect the object, analyze the object for prominent colors, and provide a plurality of color options, sequentially one at a time, using the lighting elements 103 and diffuser 111 for a certain period of time, for example 3 minutes. Users would then be able to select the most suitable color using the user-interface 119.

Figure 4:
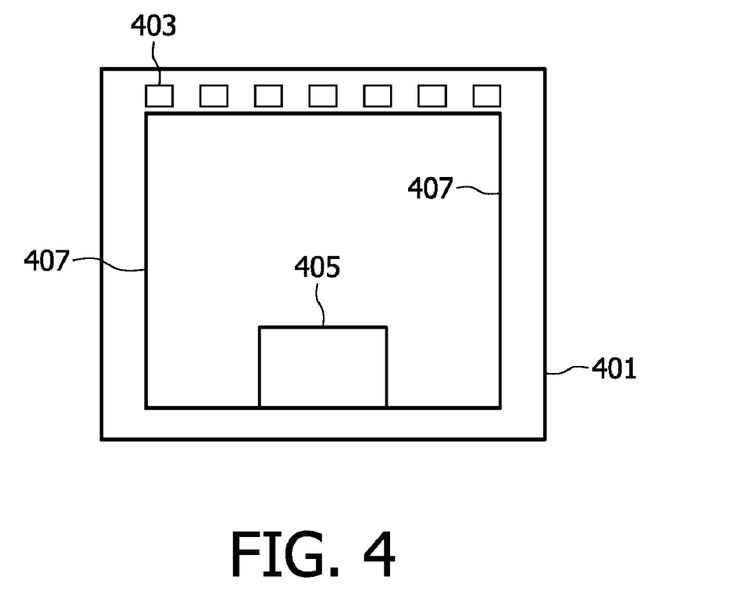
FIG. 4 is a display system in accordance with the present system further comprising means for choosing a particular color out of a variety of offered colors.

FIG. 4 shows a user interface 401 containing color options 403 displaying various colors offered to a user based on an analysis of prominent colors of an object that is displayed within the user interface 401 as object image 405. Object image 405 may be obtained by a smart camera (not shown) imaging the object that is within a display area. The color options may also be displayed on displayed side portions 407. Providing the object image 405 within the user interface 401 together with the color selections on displayed side portions 407 may simplify a selection of the color desired by the user by enabling the user to get a feel of the combination of the object and potential colors separate from the effect provided in the actual display area. The user may select the color to be exhibited by the system by, for example, touching the user interface 401 in an area of a desired color option from among the color options 403.

In the present system, in the event the system is positioned in a particular area of a shop where objects are exhibited, such as shelving, etc., the smart camera may be directed toward the area and the image processed extracting the prominent colors of objects, etc. The color lighting at that particular area of the shop may then be modified, either automatically or manually as discussed above.

Figure 5:
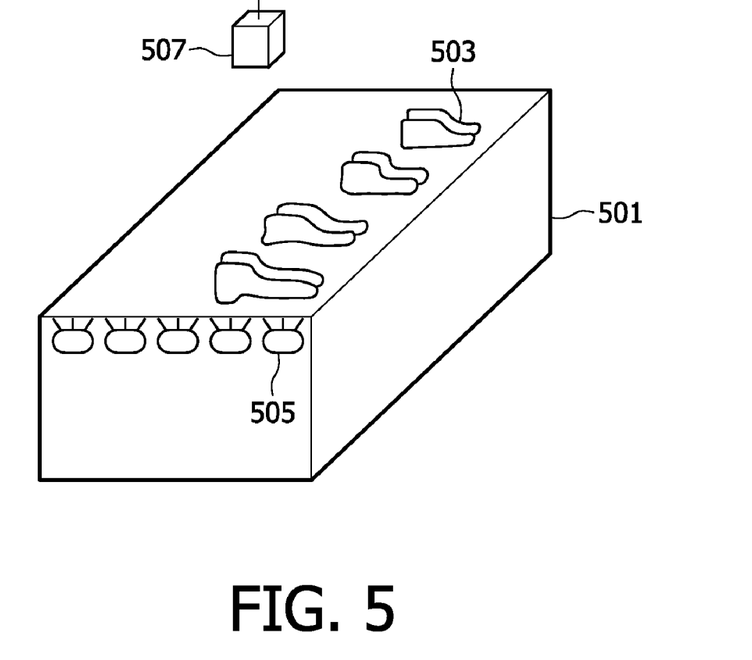
FIG. 5 is a display system in accordance with the present system wherein the display system is a particular area of the shop.

FIG. 5 shows an embodiment where the system operates together with a particular display surface 501 within a retail store. A smart camera 507 is directed towards objects 503, detecting prominent colors of the objects 503. Lighting elements 505 positioned below the display surface 501 are operable to modify a perceived color of the display surface 501 to match, complement, etc. the prominent colors.

In another embodiment, the system may contain a database of information for modifying the color. Such information may include which colors of objects match other colors or given combinations of colors. The information may also include object 'metadata' information. In this manner, objects that contain discernable identifying information, such as may be contained on radio frequency identification tags (RFID) 121 as shown in FIG. 1 may be captured by the system. The metadata information may relate to color values of each object in a collection including suggested presentation colors that match or complement colors of the objects. In this embodiment, the smart camera 105 may be replaced or supplemented with an RFID receiver for receiving the metadata present on the RFID tags of the objects.

Figure 6:
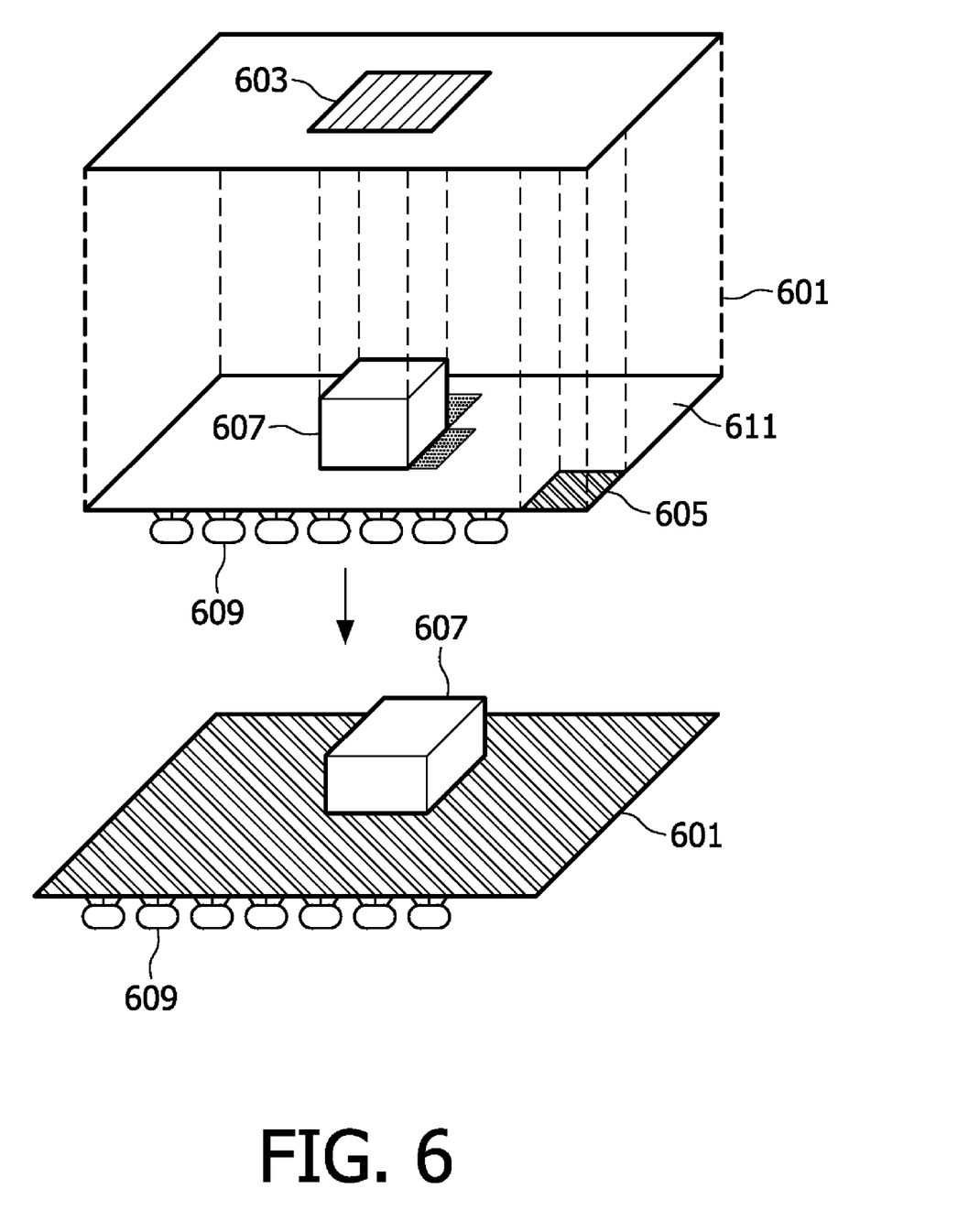
FIG. 6 is a display system in accordance with the present system wherein the smart camera contains color sensing technology.

The smart camera useful in the instant system may comprise a color sensor technology capable of detecting a color, pattern, or picture, such as a logo, on a piece of paper. In this way, a user may present a desired color to the system and have it exhibited or matched/complemented by the lighting elements. FIG. 6 shows an embodiment of a system 601 with a smart camera 603 having the capability of color sensing. Lighting elements 609 are illustratively positioned below a floor surface 611 for coloring a perceived color of the floor surface 611. In this embodiment, a piece of paper 605 may be placed within a particular location sensible by the smart camera 603 for color sensing. The piece of paper 605 may visually exhibit characteristics such as a color, texture, pattern, etc. that are discernable by the smart camera 603. The system may then identify the visual characteristics of the paper and control the lighting elements 609 to exhibit a matching or complementing color, texture, pattern, etc. that is visually discernable on the floor surface 611.

FIGS. 7-10 provide an example of how alternate colors may be determined and offered to a user by the processor.

Figure 7:
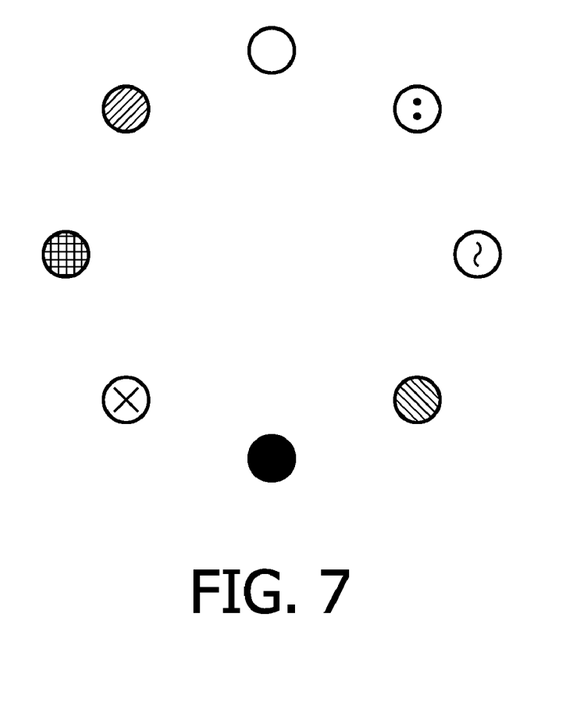

FIG. 7 is an example of a color wheel that in effect, may be utilized by the present system for selecting analogous or complementary colors. As shown, different colors are positioned around the color wheel, allowing two or more colors to be matched with one another. A given color wheel arrangement may be previously stored in the memory 117 and/or may be determined dynamically by the processor 113 in response to a determination of the prominent color.

Figure 8:
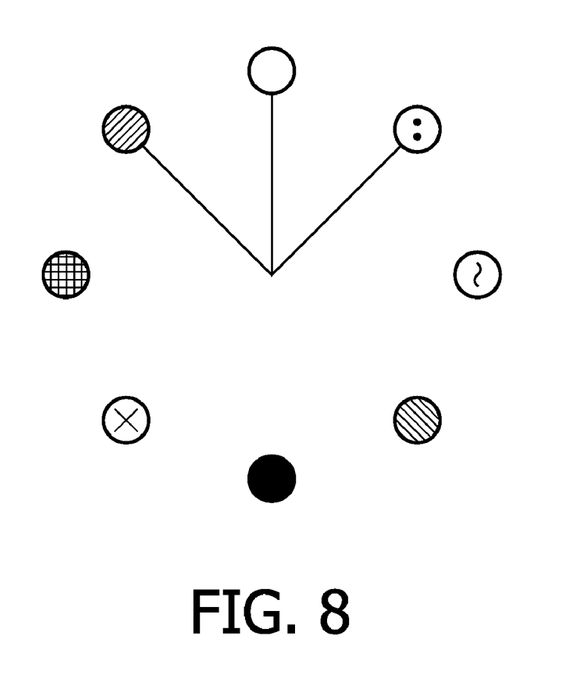

FIG. 8 is an example of the color wheel being used to select an analogous color to the prominent color, such analogous color or colors may be positioned on either side of a prominent color and may be offered as alternatives to a user by the present system.

Figure 9:
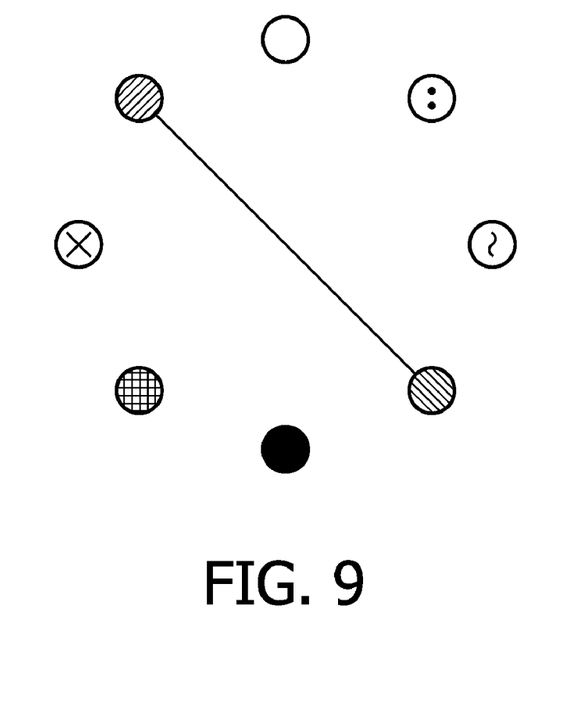

FIG. 9 is an example of the color wheel being used to select a color that is complementary to the prominent color, such complementary color being directly across from the prominent color on the color wheel. As discussed above, the complementary color may then be provided by the present system for user confirmation and selection.

Figure 10:
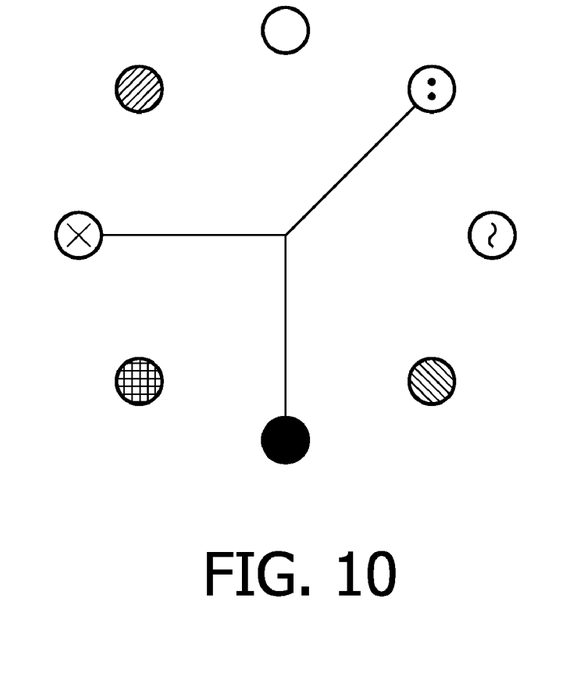

FIG. 10 is an example of the color wheel being used to select colors that are split or indirectly complementary to the prominent color that again may be provided by the present system for user confirmation and selection.

In the system of the instant invention, the processor contains a color selecting means, such as a computer program comprising a database that may be stored in the memory 117 (see, FIG. 1), for selecting an analogous, complementary, or split complementary color or colors based upon the product's prominent color or colors as determined by the processor. The color selecting means will then offer appropriate color or colors and forward the RGB value to the LED-array to provide a user a visualization of the offered color or colors.

In one embodiment of the instant invention, in use, upon a shop customer approaching the display system, the processor may detect the approach of the customer through use of the smart camera 105 or by other detecting devices. In response, the processor may alter the visualized color of the display cube to turn or fade to white, black or other neutral color determined from the prominent color. This will allow the customer to view the product clearly. In a case wherein the customer removes the product from the display system, the visualized color of the display system may turn or fade to a neutral or dark color, for example black. Upon the customer replacing the product back into the display system, the visualized color may then revert back (e.g., such as fade) to the original matching color. The removal of the object may be detected by the smart camera or by other detecting devices, such as a sensor positioned under the object to detect the object placement.

Having described embodiments of the present system with reference to the accompanying drawings, it is to be understood that the present system is not limited to the precise embodiments, and that various changes and modifications may be effected therein by one having ordinary skill in the art without departing from the scope or spirit as defined in the appended claims. For example, while the lighting elements for producing a diffused light over a surface of a diffuser (e.g., lighting elements 103) and the lighting elements that may deliver object illumination (e.g., lighting elements 107) have illustratively been described as separate lighting elements, there is no need that they in fact be separate. Illustratively, both described lighting elements may be combined into a single lighting unit, such as an IMI (Indoor Matrix Illumination) system that may be used (e.g. integrated in the "ceiling" of the display cube) to both illuminate the object with white light, and create corresponding color light for the environment around the object. Numerous alternate embodiments, combinations of embodiments, and sub-combination of embodiments should be understood to be within the scope of the claims that follow.

In interpreting the appended claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) any of the disclosed elements may be comprised of hardware portions (e.g., including discrete and integrated electronic circuitry), software portions (e.g., computer programming), and any combination thereof;
f) hardware portions may be comprised of one or both of analog and digital portions;
g) any of the disclosed devices or portions thereof may be combined together or separated into further portions unless specifically stated otherwise; and
h) no specific sequence of acts or steps is intended to be required unless specifically indicated.

The invention claimed is:

1. A color identifying display system comprising:
a lighting surface configured to have an alterable apparent surface color;
a color capture device configured to capture color of an object placed within a detection area, and a processor, wherein the lighting surface and the color capture device are operably coupled to the processor, wherein the processor is configured to analyze the captured color to determine a prominent color of the object, and wherein the processor is configured to control a color of the lighting surface based on the determined prominent color; a detector to detect a presence of a user in proximity to the object, wherein the processor is configured to alter the color of the lighting surface to a neutral color in response to detecting the presence of the user; a highlighting lighting element, wherein the processor is configured to provide lighting of the object in response to detecting the presence of the user, wherein the color capture device is configured to determine a shape of the object, and wherein the processor is configured to provide the lighting of the object in a shape that substantially conforms to the shape of the object.

2. The color identifying display system of claim 1, wherein the lighting surface is a wall of a display cube.

3. The color identifying display system of claim 1, wherein the processor is configured to control the color of the lighting surface to match the prominent color.

4. The color identifying display system of claim 1, wherein the processor is configured to control the color of the lighting surface to produce one of an analogous color and complementary color to the prominent color.

5. The color identifying display system of claim 1, wherein the processor is configured to provide a user interface for a user to select one of a plurality of colors for the lighting surface based on the determined prominent color.

6. The color identifying display system of claim 1, wherein the lighting surface is one of a plurality of lighting surfaces that are positioned around the object.

7. The color identifying display system of claim 1, wherein the object is positioned on the lighting surface.

8. The color identifying display system of claim 1, wherein the color capture device is a radio frequency identification (RFID) receiver that is configured to capture the color of the object by receiving RFID transmissions from the object.

9. The color identifying display system of claim 8, wherein the RFID transmissions from the object include information of analogous and complementary colors to the color of the object.

* * * * *